3,387,982
PROCESS FOR MANUFACTURING A HARD BITUMINOUS COMPOSITION WITH A CURING AGENT
Dilworth T. Rogers, Summit, and John C. Munday, Cranford, N.J., assignors to Esso Research and Engineering Company, a corporation of Delaware
Continuation-in-part of application Ser. No. 256,666, Feb. 6, 1963. This application Mar. 7, 1963, Ser. No. 263,444
5 Claims. (Cl. 106—281)

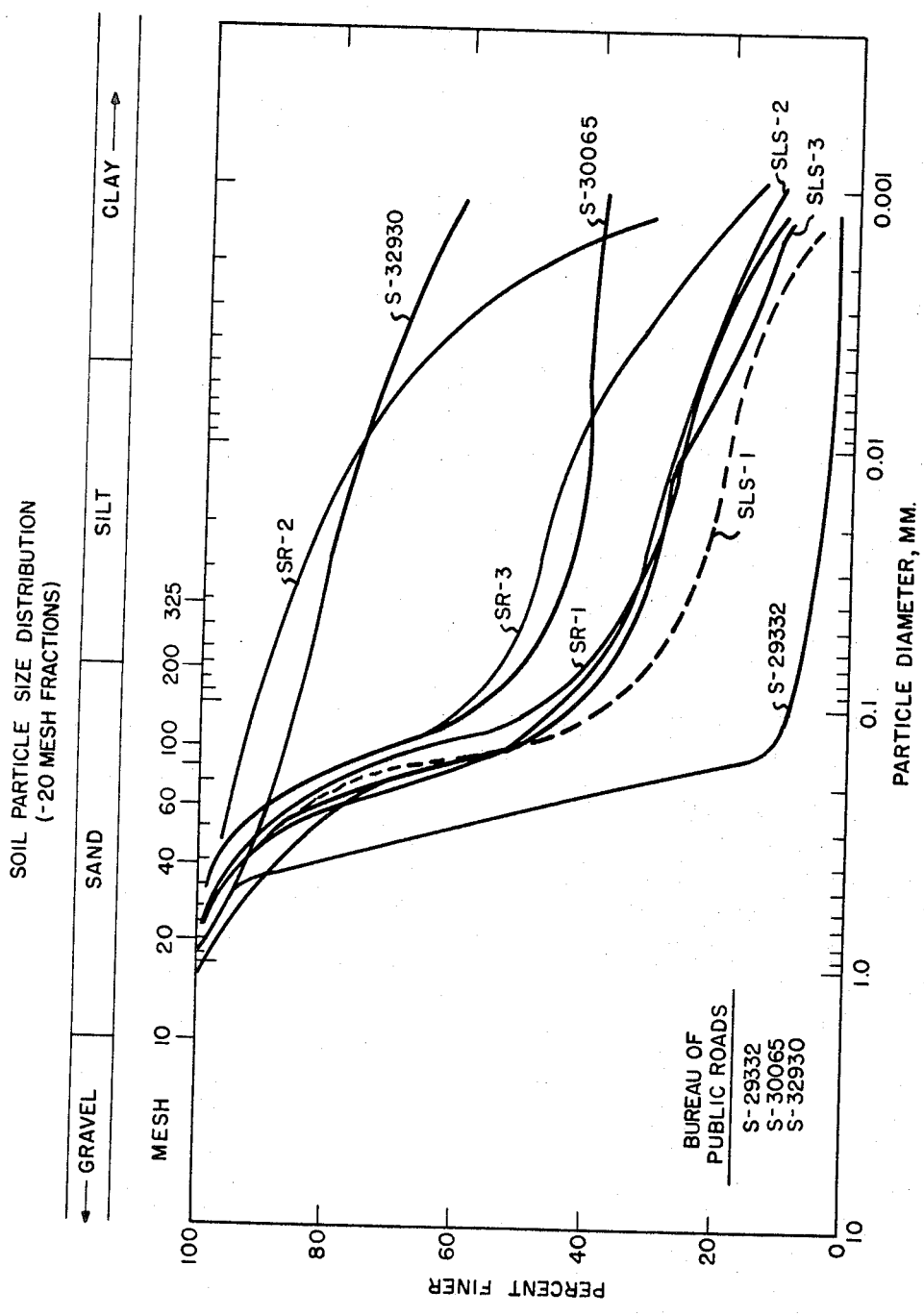
Dilworth T. Rogers
John C. Munday     Inventors
By W. O. Heilman
Patent Attorney

United States Patent Office 3,387,982
Patented June 11, 1968

The present invention is concerned with solid compositions stabilized with petroleum residua and with a process of manufacture of these compositions and with shaped articles of manufacture comprising these compositions. The invention is particularly concerned with improved asphalt-stabilized soil and aggregate compositions having enhanced dry and wet compressive strength, superior tensile and flexural strengths, and relatively low water absorption properties. The present invention is specifically concerned with the use of curing agents to increase the compressive strength.

The present invention is a continuation-in-part of Ser. No. 256,666, filed Feb. 6, 1963, entitled, "Improved Asphalt Solid Compositions and Process of Manufacture," inventors Dilworth T. Rogers and John C. Munday, which, in turn, is a continuation-in-part of Ser. No. 178,038, filed Mar. 7, 1962, entitled, "Stabilized Asphalt Solid Compositions and Process of Manufacture," inventors Dilworth T. Rogers and John C. Munday. Both Ser. No. 256,666 and Ser. No. 178,638 are abandoned.

The stabilization of soil and other solids employing petroleum binders particularly for use in the construction field has not enjoyed appreciable commercial success. A very limited number of homes has been built, mainly in the western part of the United States, in which sandy clay-type soils in conjunction with asphalt have been used to form building blocks. In making these blocks, the asphalt was applied to the soil as a water emulsion of an asphalt cutback solution in a naphtha. The mixture was then hand-tamped generally in wooden molds, and the blocks sun-cured for several weeks. The asphalt functioned mainly as a waterproofing agent rather than as a binder, since the asphalt increased the wet strength of the soil but did not appreciably increase dry strength. In this process, it was considered essential to wet the soil with water before mixing it with the asphalt cutback, or to use an asphalt water emulsion. The water deflocculated the clay aggregate and served as a compaction lubricant.

It was found that building blocks produced by this prior art method and the composition thereof gave maximum unconfined wet compressive strengths at about 3 to 8 wt. percent asphalt, depending upon the type of soil used, but failed to approach the compressive and tensile strength of commercially available concrete blocks and brick. Despite their low unit strength, these materials were of some limited use in arid or semi-arid regions in the form of thick, solid blocks where economic factors favored their use in certain types of construction. These blocks were wholly unsuitable in other geographical regions where there was a significant variation in humidity or where these building materials would contact moisture. Thus, beside very low compressive and tensile strength necessitating the use of thick solid blocks for adequate strength, the prior art asphalt-stabilized soil compositions could not be used in home construction, even in solid block form, where there was water contact or a variation in the humidity of the air, without a subsequent exterior coating. Thus, these prior art materials could not be employed, for example, below grade or at footing levels. A further disadvantage of these prior art materials was the poor adhesion characteristics of exterior finishes such as paint, mortar, stucco and the like to the exterior surface of the blocks. The blocks apparently expanded and contracted in response to small changes in the humidity of the air, resulting in extensive cracking and peeling of exterior coatings.

There has now been discovered a stabilized composition composed of critical quantities of subdivided solid and petroleum residua and a process for stabilizing solids, which composition and process avoid many of the disadvantages of the prior art and provide, for example, asphalt-stabilized aggregate and soil compositions of enhanced dry and wet compressive strength. In accordance with a specific adaptation of the present invention, a critical quantity of asphalt is used in conjunction with soil of certain particle-size distribution and is compressed within a critical range of its theoretical 100% density. The compressed solid is then heat-treated under specific conditions to produce a high quality product suitable as a building material such as blocks, bricks, tile, board, pipe and the like.

Thus, in accordance with the present invention 8 to 30% of asphalt by weight is mixed with the subdivided solid. The mixture is then compressed to a density of about 80 to 98% based upon the theoretical density. The compressed product is then cured at a temperature in the range from about 300 to 500° F. for a time period of from about 4 to 80 hours. The binder employed in the present invention comprises that family of materials commonly referred to as asphalts, such as natural or petroleum residua of thermoplastic solid or semi-solid consistency at ambient temperatures, normally of brown to black cementitious material in which the predominating constituents are bitumens. The bituminous material to be used may be selected from a wide variety of natural and industrial products. For instance, various natural asphalts may be used such as natural Trinidad, gilsonite, Grahamite and Cuban asphalts. Petroleum asphalts suitable for the purposes of this invention include those asphalts obtained from California crude, from tar sands, Venezuelan or Mexican petroleum asphalt, or Middle East or a Mid-Continent airblown oil and the like, or combinations thereof. Petroleum asphalts also include those asphalts derived from hydrocarbon feed stocks such as bitumen, asphaltic residua obtained in a petroleum refining process such as those obtained by the vacuum distillation of petroleum hydrocarbon crude oils, the solvent deasphalting of crude residuum fractions, tarry products from the chemical refining such as oxidation of high molecular weight hydrocarbons, those asphalts obtained from hydrogenated coal products, the asphaltic material obtained in the thermal or catalytic cracking of petroleum to obtain gasoline or other light fractions or any combination of these materials.

Petroleum asphalts are generally prepared from petroleum residual oils obtained by the distillation of an asphaltic or semi-asphaltic crude oil or thermal tar or by the fluxing of harder residual asphalts with heavy petroleum distillates. Such residual oils are high boiling liquids or semi-solids which may have softening points from about 32° F. to about 120° F. and are generally characterized by specific gravities ranging from about 0.85 to about 1.07 at 77° F. Other properties of such residual oils, normally termed asphalt bases or asphalt fluxes, may vary to a considerable extent depending upon the particular crude oil from which they are derived.

Asphalts prepared from residual oils such as those set forth above may be classified as either straight reduced asphalts or as oxidized asphalts. Straight reduced asphalts are produced by the steam distillation, vacuum distillation, blending or solvent deasphalting of residual oils. These operations remove a significant quantity of the lower boiling, more volatile material present in the residual oils and result in a product having a softening point between about 100° and about 170° F., although higher softening points can be obtained by more extensive treatment. Oxidized asphalts are produced by contacting a residual oil with air or a similar oxidizing agent, alone or in the presence of an oxidizing catalyst such as ferric chloride, phosphorus pentoxide or the like. The oxidation process serves to dehydrogenate certain constituents of the asphalt, leading to the evolution of water and some carbon dioxide. Oily constituents are thus converted into resins and resins are converted into asphaltenes. Very little oil is removed during the oxidation operation. The penetration and ductility properties of oxidized asphalts are generally somewhat higher for a given softening point than are those of the straight reduced products. Both straight reduced asphalts and oxidized asphalts are useful in the invention.

Although the petroleum asphalts are preferred, other suitable bituminous material would include coal tar, wood tar, and pitches from various industrial processes. The invention can also be successfully practiced with chemically modified asphalts such as halogenated, e.g. chlorinated or sulfurized or phosphosulfurized asphalts, as well as asphalts treated with epoxides or haloepoxides like ethylene oxide and epichlorohydrin, or with silane halides, nitrobenzene, chlorinated aliphatics such as carbon tetrachloride and halohydrocarbons such as methylene chloride and the like. Additionally, the asphalts can be mixed with minor amounts, e.g. 1 to 10 wt. percent, of other natural and synthetic thermoplastics and thermosetting materials like rubbers, resins, polymers and elastomers, of an oily, resinous or rubbery nature. Nonlimiting examples of suitable materials include polyolefins, polypropylene, polyethylene, polyisobutylene, polymers from steam-cracked naphthas and the like; natural or synthetic rubber-like butyl rubber, halogenated butyl rubber, polydienes like polybutadiene, elastomeric copolymers of styrene and butadiene, copolymers of ethylene and propylene and the like; epoxy resins; polyalkylene oxides; natural and synthetic waxes; polyvinyl acetates; phenol aldehyde condensation products; and the like and combinations thereof.

Furthermore, in a modification wherein the asphalt is chemically modified by reaction with liquid reagents, for example, $CCl_4$, the reagent liquid can often be used as the asphalt solvent, whereupon the desired reaction occurs before, during or after the compaction of the soil-asphalt cutback mixture, or during or after the curing step, or the reaction may occur continuously during both finishing process steps.

Satisfactory asphalts, for example, are those designated in the trade as fluxes, binders, and various oxidized asphalts. Data on some typical suitable asphalts are shown below:

| Asphalt | Softening Point, ° F. | Penetration at 77° F. |
| --- | --- | --- |
| Flux A | <75 | >300 |
| Binder C | 113 | 85-100 |
| Oxidized Asphalt 1 | 180-200 | 24 |
| Oxidized Asphalt 2 | 200-235 | 18 |

The solid material of the stabilized compositions is any dry inorganic solid material, with earth and soil the economically preferred solid materials for the production of hard dense structures useful in building construction. Suitable nonlimiting examples of other aggregate materials include finely subdivided cinder, expanded slag or clay, rock wool, steel wool, abrasives, coke from coal or petroleum, iron ore, diatomaceous earths, clays, soil, silt, coal, asbestos, glass fibers, quartz, carbonate rocks, volcanic ash, and the like and any combination thereof.

Thus, a wide variety of solids can be used in conjunction with the asphalt binder to form high strength structures. In general, minerals are the preferred solids especially those which have well defined crystal shapes and in particular those crystals which are readily compacted to low voids-content structures. For example, kaolinite, chlorite, talc, mica, specular hematite which crystallize as plates or discs are readily compacted with asphalt to produce high strength structures. Asbestos, which has a fibrous structure and attapulgite, which crystallize as needles are less readily compacted.

As is well known, finely divided solids are more readily compacted to give nonporous structures than coarse. Clays and clay soils are examples of finely divided solids occurring in nature. By the process of the invention they can be used to prepare high strength structures. All types of clay soils can be used, ranging from practically 100% clay content to those with low clay content, if the structure will not be exposed to water. If the structure is to be exposed to water it is essential that the amount of the so-called expanding clays be kept at low levels, and generally below 10%, preferably below 5%. The expanding clays are those which swell in the presence of water or other small polar molecules, and include the montmorillonites (bentonites), vermiculite, and "open-end" illite. Although these clays with asphalt have high dry strength they disintegrate in the presence of water. For use in the presence of water the soil also should not contain appreciable amounts of organic matter or water-soluble salts.

In order to waterproof clay soils with asphalt it is necessary to cover the particles with a thin layer of asphalt. Since the surface area of finely divided solids is high it is not unexpected that larger amounts of asphalt would be needed to provide a protective layer on high clay-content soils. For economic reasons therefore it is desirable to use relatively low clay content soils in asphalt-soil block manufacture. A very satisfactory soil is one which contains about 20-25% clay, the remainder being silt and sand. With this soil 8-12% asphalt by weight on the soil will provide high strength and adequate water repellancy. It will be obvious that sandy, silty, and clayey soils can be blended to achieve the desired particle size distribution.

With some soils and minerals it is possible to obtain high strength with little or no clay or finely-divided particles (below $5\mu$) present. In these, as mentioned previously, the coarse particles are present as crystals of nearly equi-dimensional size (plates, discs, prisms, etc.) which are easily compacted to low void content structures. When the coarser particles are not of this type, as found in sand and some silts, the strength of the asphalt soil blocks will be somewhat lower but may be adequate for applications where high loads will not be applied such as in one-story dwellings.

The particle size of soils is ordinarily determined by ASTM Method D422-54T. In this procedure particle size is calculated from the rate of settling in a water suspension. Although clay soils form agglomerates and aggregates of the primary soil particles they are largely broken up by water. It is thus possible to have a soil which appears to be very coarse on the basis of a dry screen analysis but which shows a high clay content in the ASTM D422-54T grain size analysis. On mixing the soil with asphalt these agglomerates or aggregates are partially permeated by asphalt, and to some extent they are disintegrated into finer particles which are coated by asphalt. Coverage is not complete, however, and one obtains a nonuniform structure which may have low strength and high water sensitivity. It is essential therefore that the larger agglomerates be broken up by light grinding or other means approaching as a limit the same state of subdivision as indicated by ASTM D422-54T before mixing with the asphalt.

Overall, soils in which kaolin is the chief clay constituent are preferred for block making. Not only is kaolin of the proper crystal shape for easy compaction but it is readily wetted by asphalt and the asphalt is not as easily displaced by water as with some other clays. There is some evidence that agglomerates and aggregates of kaolin are broken up during simple mixing with asphalt and accordingly the amount of preliminary crushing is reduced and coverage is more complete.

FIGURE 1 shows the particle size distribution of various soils which have been used successfully in the process of the invention. It will be noted that clay content (<0.005 mm.) ranges up to 70%. Generally, desirable soils contain from 10% to 60% clay, with 20% to 40% clay preferred. Among the soils which have been found to be useful are Sayreville sandy clay, New Jersey red soil, Houston black clay, Lakeland fine sand, Ruston loamy sand, Cecil coarse sandy loam, Cecil fine sandy loam, Marion loam, Neshorning silt loam, Chester silt loam, Lakeland fine sand, Nigerian latterite, Georgia kaolin, etc. Although the soils named above do not contain much gravel (diameter more than 2 mm., equivalent to 10 mesh), soils containing gravel or to which gravel has been added can be employed.

The asphalt can be incorporated with the subdivided solid material as a solvent cutback, using a volatile organic cutback solvent such as petroleum naphtha or other solvent boiling in the range of about 175° F. to 600° F., e.g. 200° F. to 400° F. The cutback solvent should preferably be one that is sufficiently volatile to be substantially volatilized during the selected curing step, i.e., a solvent having a boiling point of less than 600° F. or advantageously less than 400° F. Suitable asphalt concentrations in the cutback solution are from 30 to 90 wt. percent asphalt, e.g. 50 to 75%. Preferably, the Furol viscosity at the temperature at which the cutback is applied should be 100 or less, e.g. 20 to 100 Furol. Suitable cutback solvents thus include, but are not limited to, hydrocarbons such as toluene, benzene, xylene, varsol, VM&P naphtha, halohydrocarbons such as carbon tetrachloride and methylene dichloride, or any combinations thereof. Whatever the solvent, it should be substantially removed from the asphalt-solid mixture prior to compaction, as disclosed in the parent application, Ser. No. 178,038.

The asphalt can also be incorporated with the subdivided solid while in the molten state and this is generally the preferred method. The temperature of the asphalt at the time of mixing should be such that the viscosity is sufficiently low that good mixing is achieved and the solid particles are uniformly coated. Suitable asphalt viscosities are in the range of about 20 to 100 Furol, corresponding to mixing temperatures from about 275° F. in the case of soft asphalts such as fluxes, to 350°–450° F. in the case of harder asphalts such as binders and oxidized asphalts. In carrying out the hot-mixing operation, the solid is generally pre-heated and charged to the mixer, and the molten asphalt is then pumped in. It is usually sufficient to introduce the asphalt as a low pressure spray, although atomized or foamed asphalt can be used. Various commercial mixers are suitable, such as the type of paddle mill known as a pug mill. Where an efficient mixer is employed, the time of mixing can be relatively short, such as one or two minutes. In some cases, however, it may be desirable to extend the mixing time to say 15–30 minutes or longer in order to harden the asphalt after incorporation with the solid. For example, it has been found that when starting with flux or binder asphalts, stronger structural products are obtained if the asphalt is hardened in this fashion by heating in air, say at 400° F., after mixing with the solid, but before compacting the mixture. Conversely, when starting with a hard asphalt such as an air-blown asphalt, it may be desirable to blanket the mixer with inert gas so as to decrease the rate of hardening.

Generally, it is preferable to mix the asphalt cutback or the molten asphalt with solid that is relatively dry, having not more than 1–2% moisture. When solid containing considerable water is employed, it is preferable to dry the solid-asphalt mixture to a fairly low water content prior to compaction. If this precaution is observed, emulsified asphalt cutbacks can be employed in the process of the invention. The amount of asphalt employed is in the range from about 8% to 30% by weight, based on the solid. Generally, the amount employed is in the range from about 10% to 20%.

The development of high strength materials from finely divided solids and residua (asphalts) depends to a marked extent on high temperature curing, e.g. 300°–500° F. The time of curing depends on the temperature level, the higher the temperature the shorter the time needed. In general, the curing conditions to produce blocks which retain their strength in the presence of water and which do not absorb water are less severe than those required to produce high dry strength.

The principal mechanism involved in the formation of high strength materials from solids and asphalt appears to be oxidation of the asphalt although the evolution of volatile material is also involved to some extent. The volatile material may be present in the original asphalt or subsequently produced by cracking and oxidation.

That oxidation is the chief mechanism is shown by comparing the results of curing in air versus nitrogen. In the latter case, with clay soil and asphalt, the compressive strength was less than one-half of those cured in air.

To develop high strength during curing, the compacted solid-asphalt structure should have sufficient porosity to permit the diffusion of oxygen into the interior of the structure and to permit the egress of volatile materials without disrupting the binder (asphalt) films. The solid particles however must be sufficiently close together so that the greater part of the binder is present as a very thin, nearly-continuous phase if high strength is to be developed on curing. Thus if there is insufficient binder to cover most of the solid particles with very thin films and if compaction is not carried to the point where the solids are brought in close proximity, low strength, especially in the presence of water, will result. On the other hand, if an excess of asphalt is present, thick films will be formed and low strength will result on curing, regardless of the degree of compaction. At low densities the strength of the structure would not be expected to be much greater than that of asphalt by itself. At high densities diffusion of oxygen into the interior of the structure and even into the interior of the thick binder films is retarded and more significantly the evolution of volatile materials is impeded. The latter effect results in severe cracking during curing and produces both deformation and low strength.

In order to designate a suitable range of density (degree of compaction) for the development of high strength an expression "Percent of Theoretical Density" has been formulated which is defined as follows:

Percent of Theoretical Density=percent of the density the solid+binder would have if there were no voids in the compacted structure.

A sample calculation would be: A compacted mixture of clay soil (d.=2.61 g./cc.) with 10 wt. percent asphalt based on the soil (d.=1.04 g./cc.) is found to have a density of 2.08 g./cc. The theoretical density (no voids) of this mixture would be $$\frac{100}{2.61} + \frac{10}{1.04} = \frac{110}{x}$$

$x = 2.29$

Percent of Theor. Den. $= \frac{2.08}{2.29} \times 100 = 90.8\%$

With sandy clay soils containing about 20–25% clay and 9–12% by weight asphalt, the desired percentage of theoretical density is usually within the range 88 to 98%, the exact level depending upon factors such as the concentration of asphalt, curing conditions, and the size and shape of the article being molded.

To achieve the advantages of the invention, the asphalt-solid mixture should be compacted to a density in the range from about 80–98% of the theoretical density, a more preferred range being from about 85–95%. In many cases, maximum strength is developed in a still narrower range, such as 88–92%. The optimum percent theoretical density varies with a number of factors, such as asphalt concentration, compaction temperature, presence of solvent at the time of compaction, curing conditions, and the size and shape of the article being molded. For example, with sandy clay soils containing about 20–25% clay and 10–12 wt. percent asphalt, the optimum density is usually in the range from about 88–94% theoretical density, while with 9% asphalt the optimum may be higher, such as about 96%. Also, whereas the optimum may be about 92% in the case of 1.28″ diameter x 3″ high briquettes, it may be about 88% in the case of 8″ x 4″ x 2.5″ bricks. Suitable compaction temperatures are from 50° to 350° F., preferably from 60° to 200° F.

In accordance with a specific adaptation of the present invention, solid compositions of enhanced strength are produced by utilizing a curing agent selected from the class consisting of nitrobenzene, dinitrobenzene, gallic acid, pyrogallol and furfural. These agents are used in a concentration of from about 0.5 to 5%, preferably in a concentration of 1 to 2% by weight based on the soil. The materials also are preferably mixed when the asphalt and soil are mixed.

The present invention may be more fully understood by the following examples illustrating embodiments of the same.

Example 1

A New Jersey sandy clay soil, referred to as Sayreville-Roxburgh mixture (SR No. 1), was mixed with 12% (by weight based on the soil) of an oxidized asphalt which had a softening point of 213° F. The asphalt was applied as a 50/50 cutback in toluene at 75° F. Agitation was provided by a Hobart mixer. The toluene was allowed to evaporate completely while the mixture was being agitated. Varying amounts of nitrobenzene were added and the mixture was then compacted into cylindrical briquettes (1.28″ in diameter x 3″ (approx.)) under a pressure of 2340 p.s.i. for 5 minutes. The briquettes were then cured in an electric oven for 16 hours at 350° F. As shown by the data in Table I the nitrobenzene serves two functions. It facilitates compaction and increases the strength of the cured briquettes. With this particular soil-asphalt combination, compaction pressure and curing conditions it appears that the optimum concentration of nitrobenzene is approximately 1–2 wt. percent based on the soil. It will be noted further that when the briquettes are compacted to high density (98% of theoretical) in the absence of nitrobenzene, low strength results.

TABLE I.—NITROBENZENE AS A COMPACTING AND CURING AGENT

[N.J. Sandy Clay (SR No. 1) plus 12% 213° S.P. Oxidized Asphalt—compacted at 75° F., 2,340 p.s.i., 5 min.]

| Wt. percent Nitrobenzene (on Soil) | Percent of Theoretical Density | Compressive Strength, p.s.i. | |
|---|---|---|---|
| | | Dry | Wet [1] |
| 0.0 | 91.0 | 2,550 | 1,820 |
| 0.5 | 90.4 | 3,270 | 2,375 |
| 0.75 | 93.3 | 3,600 | 2,620 |
| 1.0 | 94.1 | 4,525 | 3,260 |
| 2.0 | 97.7 | 4,185 | 3,450 |
| 5.0 | 100.0 | [2] 3,710 | [2] 3,280 |
| 0.0 | [3] 98 | [2] 1,700 | [2] 1,700 |

[1] After immersion in water for 7 days at 75° F.
[2] Developed cracks during curing.
[3] Compacted at 6,250 p.s.i.

Example 2

Briquettes were prepared as in Example 1 except that a 180°/200° S.P. oxidized asphalt was used in place of the 213° S.P. oxidized asphalt. As shown by the data in Table II the addition of nitrobenzene to the asphalt-soil mixture markedly increased the density on compaction and also resulted in increased strength.

TABLE II.—NITROBENZENE AS A COMPACTING AND CURING AGENT

[N.J. Sandy Clay (SR No. 1) plus 12% 180°/200° S.P. Oxidized Asphalt]

| Wt. percent Nitrobenzene (on Soil) | Percent of Theoretical Density | Compressive Strength, p.s.i. | |
|---|---|---|---|
| | | Dry | Wet |
| 0.0 | 89.5 | 3,050 | 1,875 |
| 3.0 | 97.7 | [1] 3,335 | [1] 2,690 |

[1] Some cracks developed during curing.

Example 3

Briquettes were prepared as in Example 1 except that a very soft asphalt, Flux A, was substituted for the 213° S.P. oxidized asphalt. As found in the previous examples the inclusion of nitrobenzene facilitates compaction and increases strength. Data are given in Table III.

TABLE III.—NITROBENZENE AS A COMPACTING AND CURING AGENT

[N.J. Sandy (SR No. 1) plus 12% Flux A]

| Wt. percent Nitrobenzene (on Soil) | Percent of Theoretical Density | Compressive Strength, p.s.i. | |
|---|---|---|---|
| | | Dry | Wet |
| 0.0 | 94.2 | 2,910 | 2,350 |
| 1.0 | 96.3 | 3,295 | 2,305 |
| 2.0 | 97.0 | 2,850 | 2,160 |
| 5.0 | 99.0 | 2,085 | |

Example 4

Briquettes were prepared according to the method of Example 1, but a binder-grade asphalt (Binder C—Pen. 77° F. of 80) was used in place of the oxidized asphalt. With this asphalt the addition of nitrobenzene while increasing the density during compaction decreased the dry compressive strength. The wet compressive strength was increased somewhat however. See Table IV.

TABLE IV.—NITROBENZENE AS A COMPACTING AND CURING AGENT

[N.J. Sandy Clay (SR No. 1) plus 12% Binder C]

| Wt. percent Nitrobenzene (on Soil) | Percent of Theoretical Density | Compressive Strength, p.s.i. | |
|---|---|---|---|
| | | Dry | Wet |
| 0.0 | 93.4 | 4,290 | 2,780 |
| 2.0 | 97.5 | 4,015 | 3,205 |

Example 5

Briquettes were prepared as in Example 1 except that Binder C was used as the asphalt. Also the Binder C was applied at 350° F. without solvent, the soil-asphalt mixture was heated for one hour before compaction and then compacted at 350° F. When nitrobenzene was included in the composition it was added during the final stage of the mixing operation. As shown by the data in Table V moderate increases in density and strength were obtained with 1% nitrobenzene. With 4% nitrobenzene the briquettes were over compacted, and cracks developed during curing.

TABLE V.—NITROBENZENE AS A COMPACTING AND CURING AID

[N.J. Sandy Clay (SR No. 1) plus 12% Binder C]

| Wt. percent Nitrobenzene (on Soil) | Percent of Theoretical Density | Compressive Strength, p.s.i. | |
|---|---|---|---|
| | | Dry | Wet |
| 0 | 94.3 | 3,775 | 2,880 |
| 1.0 | 95.3 | 3,815 | 2,980 |
| 4.0 | 100.0 | [1] 3,865 | [1] 2,890 |

[1] Cracks developed during curing.

Example 6

Briquettes were prepared and tested as in Example 1 with the following exceptions. The toluene was not completely evaporated prior to compaction—1.5 wt. percent (on soil) remaining. Curing was carried out in a heatedair type oven in which a large volume of heated air was being circulated. A slightly different soil was also used, New Jersey Loose Sandy Clay (SLS-3) which contained slightly less clay. As shown by the data in Table VI both nitrobenzene and dinitrobenzene markedly increase compressive strength.

TABLE VI.—NITROAROMATICS AS CURING AGENTS

[N.J. SLS-3 Soil plus 12% 213° S.P. Oxidized Asphalt plus 1.5 Wt. percent Toluene]

| Additive | Wt. percent | Unconfined Compressive Strength, p.s.i. | |
|---|---|---|---|
| | | Dry | Wet |
| None | | 3,680 | 2,735 |
| Nitrobenzene | 1.0 | 4,525 | 3,260 |
| m-Dinitrobenzene | 1.0 | 4,345 | 3,410 |

Example 7

Briquettes were prepared as in Example 1 except that three different soils were used in place of the New Jersey Sandy Clay soil. These were Iowa Loess, adobe gravel (Arizona) and a Wyoming bentonite (Big Horn Clay Company). As shown by the data in Table VII, the inclusion of nitrobenzene increased the wet strength of the adobe and Iowa Loess briquettes but although it markedly increased the dry strength of the bentonite briquette, the wet strength was not improved.

TABLE VII.—NITROBENZENE AS A CURING AGENT

[Different Soils 213° S.P. Oxidized Asphalt]

| Soil | Wt. percent Asphalt | Wt. percent Nitrobenzene | Compressive Strength, p.s.i. | |
|---|---|---|---|---|
| | | | Dry | Wet |
| Iowa Loess | 18 | 0.0 | 3,390 | 685 |
| Do | 18 | 1.0 | 3,680 | 1,290 |
| Bentonite | 24 | 0.0 | 1,760 | 0 |
| Do | 24 | 1.0 | 2,820 | 0 |

Example 8

TABLE VIII

[SR No. 1 plus 12% 213° S.P. Ox. Asphalt—Compaction: 2,340 p.s.i., 1.5% Toluene (on soil). Curing: 16 hrs. at 350° F., Convection-Type Oven]

| No. | Additive | Weight percent (on Soil) | Density, g./cc. | Percent of Theor. Density | Compressive Strength, p.s.i. | |
|---|---|---|---|---|---|---|
| | | | | | Dry | Wet |
| D-150 | None | | 2.09 | 94.0 | 3,680 | 2,735 |
| 41 | Nitrobenzene | 1.0 | 2.07 | 93.4 | 4,525 | 3,260 |
| 146 | Gallic Acid | 2.0 | 2.08 | 94.0 | 4,680 | 3,175 |
| 145 | Pyrogallol | 2.0 | 2.08 | 94.0 | 4,390 | 2,975 |
| 103 | Dinitrobenzene | 1.0 | 2.06 | 93.0 | 4,345 | 3,410 |
| 102 | Furfural | 2.0 | 2.09 | 94.0 | 4,095 | 3,080 |
| 104 | Formic Acid | 2.0 | 2.06 | 93.0 | 3,540 | 2,890 |
| 149 | Toluene Sulfonic Acid | 1.0 | 2.13 | 95.6 | 3,530 | 2,270 |
| 111 | Nitrocellulose | 2.0 | 2.01 | 90.3 | 3,300 | 1,950 |
| 144 | Catechol | 2.0 | 2.11 | 95.0 | 3,040 | 2,720 |
| 110 | Urotropine | 2.0 | 1.98 | 89.2 | 2,940 | 1,745 |
| 107 | Buton 300 | 2.0 | 2.06 | 94.5 | 2,840 | 2,540 |
| 147 | Paranox 441 | 2.0 | 2.12 | 95.3 | 2,775 | 2,300 |
| 148 | Phenothiazine | 2.0 | 2.08 | 93.6 | 2,040 | 2,410 |

Thus, there are several advantages in the use of the nitrocompound. Because of the strong plasticizing power of nitrocompounds especially nitrobenzene and other aromatic nitrocompounds, for asphalt it is possible to employ harder asphalts. Since the harder asphalts require less oxidation, curing is necessarily less drastic (lower temperatures and shorter time). When starting with hard asphalts there is less volatile material which must escape during curing and also a lesser amount of volatile oxidation products, both of which tend to disrupt and weaken the binder film. Also the oxidizing agent is uniformly distributed throughout the structure and more uniform curing results than when air alone is the oxidizing agent since the rate of curing in the interior of the structure is limited by the rate of diffusion of oxygen. Thus by employing nitrocompounds one can employ hard asphalts, can compact to higher densities which will withstand curing without cracking and strong, water resistant structures result.

What is claimed is:

1. A process for the manufacture of a hard bituminous solid composition which comprises mixing from about 8 to 30 wt. percent of a bituminous binder, 0.5 to 5 wt. percent of a curing agent selected from the group consisting of nitrobenzene, dinitrobenzene, gallic acid, pyrogallol and furfural with finely divided solid, by weight percents based on the solid, compressing the mixture to 80 to 98% of its theoretical density and curing the compressed mixture at a temperature in the range from about 30° to 500° F. for a time period in a range from about 4 to 80 hours.

2. Process as defined by claim 1 wherein the curing temperature is in the range from 350 to 450° F.

3. Process as defined by claim 2 wherein the time period for curing is in the range from about 8 to 24 hours.

4. A process as defined by claim 1 wherein the amount of binder present is in the range from about 10 to 20 wt. percent, wherein the mixture is compressed to 85 to 95% of the theoretical density of the solid composition.

5. Process as defined by claim 4 wherein said soil contains from about 10 to 60% of clay.

References Cited

UNITED STATES PATENTS

| 1,966,094 | 7/1934 | Herbst | 106—280 |
| 2,500,209 | 3/1950 | Shea et al. | 106—280 X |
| 2,917,395 | 12/1959 | Csanyi | 106—283 X |
| 3,261,892 | 7/1966 | Sommer et al. | 264—29 |
| 3,168,602 | 2/1961 | Davis et al. | 264—29 |
| 3,287,146 | 11/1966 | Rogers et al. | 324—75 |
| 2,764,523 | 9/1956 | Cottle et al. | 208—44 XR |
| 2,992,935 | 7/1951 | Winslow | 208—44 XR |
| 3,275,585 | 9/1966 | Baum et al. | 208—44 XR |

JAMES A. SEIDLECK, Primary Examiner.

J. B. EVANS, Assistant Examiner.